Patented May 22, 1934

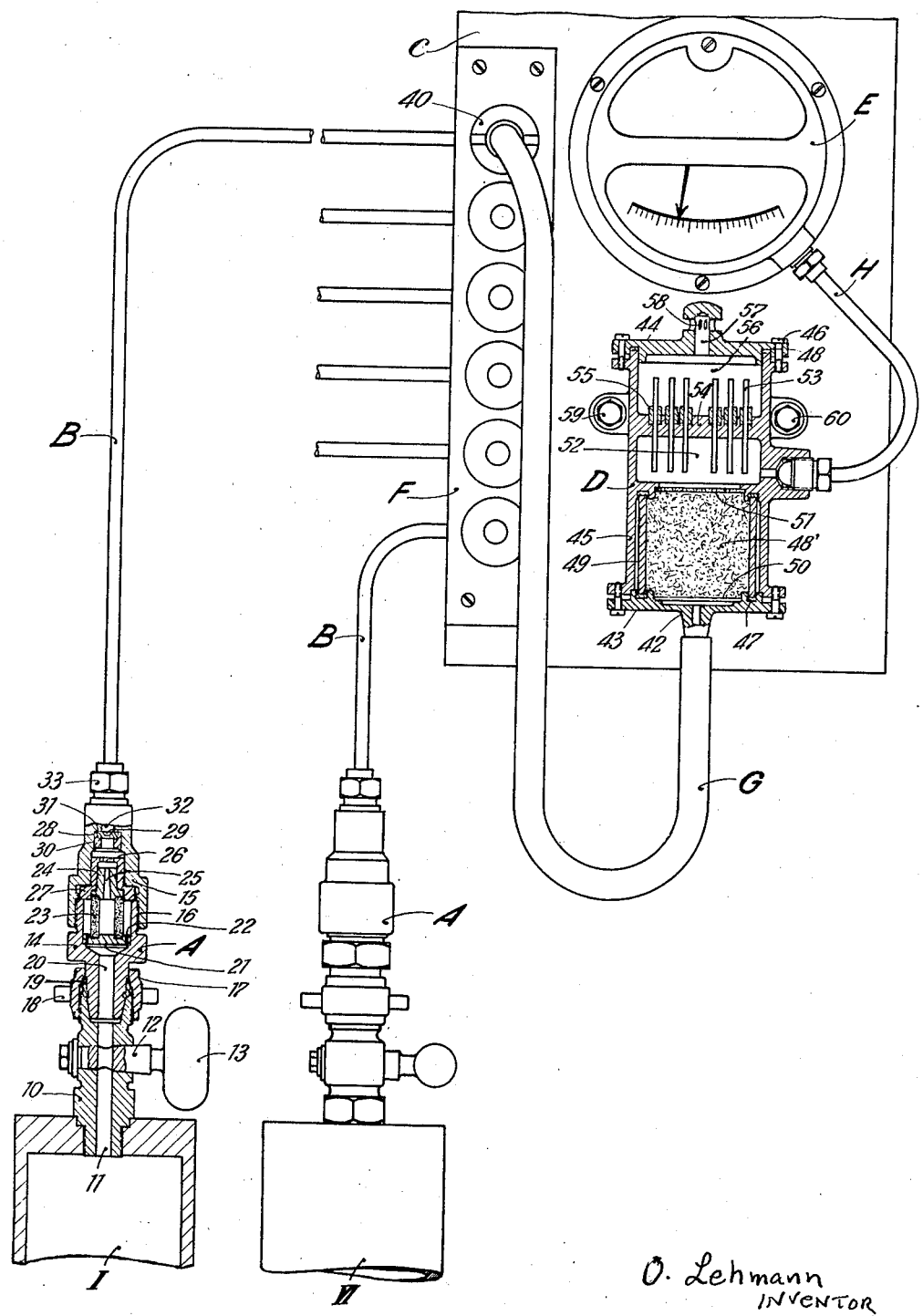

1,960,158

UNITED STATES PATENT OFFICE 1,960,158

MEAN PRESSURE GAUGE

Otto Lehmann, Hamburg, Germany

Application January 14, 1931, Serial No. 508,731
In Germany July 26, 1929

6 Claims. (Cl. 73—31)

The invention relates to a device for the measurement of the mean pressure which occurs in the working cylinders of reciprocating engines of all descriptions when in operation. The invention is adapted particularly for use in the case of such reciprocating engines in which a gaseous or vapourous medium is compressed in the cylinders, such as, for instance, steam engines and internal combustion engines.

The determination of the mean pressure in the cylinders of reciprocating engines is important for the reason that the power of the engine is a function of the mean piston pressure, the power being in direct ratio to this pressure.

The subject of this invention is to provide a measuring device for the aforesaid purpose, which possesses no actuated parts which by their inertia effect would render the measurements inaccurate.

It is furthermore an object of the invention to create a measuring device which includes the usual pressure and volume gauges as means of indication.

It is, moreover, an object of the invention to provide a measuring device for the above mentioned purpose which can conveniently be mounted on reciprocating engines of every description, without reducing their power.

It is furthermore an object of the invention to create a measuring device for the aforesaid purpose which can be connected up at option with different cylinders of one and the same reciprocating engine one after the other.

It is finally an object of the invention to provide a measuring device for the aforesaid purpose which can also be used for the measurement of gases and vapours which contain impurities.

In accordance with the invention a quantity of gas or steam proportional to the piston pressures occurring is continuously drawn from the cylinder of the reciprocating engine and measured in a convenient manner. The relation of the weight of the aforesaid quantity of steam or gas to the mean piston pressure will be found from the following equations of physical state:

Let $G$ represent the weight of gas or steam continuously drawn from the cylinder, which forms the basis for the measurement, $F$ the cross-section of the aperture through which the volume of gas or steam flows from the cylinder, $\psi$ a constant $p$ the absolute pressure in the cylinder, and $\beta$ the specific gravity of the gaseous or vapourous medium drawn from the cylinder, the mean pressure of which is to be measured.

The relation then holds good for reciprocating engines $$G = F.\psi.\sqrt{p.\beta} \qquad (1)$$

Now furthermore $$\beta = \frac{p}{R.T} \qquad (2)$$

in which $R$ is a constant and $T$ the absolute temperature.

If this value is inserted for $\beta$ in the equation (1), we obtain $$G = F.p.\psi.\sqrt{\frac{1}{R.T}} = \text{Const.} \cdot p \qquad (3)$$

Consequently the weight of the vapourous or gaseous medium drawn from the cylinder is proportional to the mean absolute pressure in the cylinder. A prerequisite for the possibility of this relation is naturally that the cross-section $F$ is made so small that no loss of pressure in the cylinder results.

This outflow or tapping-off aperture for the measurement stream may be made in any way found convenient. It may be contained, for instance, in a nozzle or a Venturi tube or be limited by a damming or baffle edge.

The aperture is suitably made with sharp edges, in order to keep the measuring stream and thereby the losses of gas from the cylinder as small as possible.

If the weight $G$ tapped off is to be determined by a measurement of pressure, it is diverted into the atmosphere by laminary flow resistances, for instance capillary tubes. The weight $G$ tapped off is then proportional to the difference between the pressures in front of and behind this laminary resistance. It is therefore sufficient to measure this difference in pressure by means of an ordinary pressure gauge, in order to determine the mean pressure in the cylinder.

It will be seen from the foregoing that the measuring device operates on the basis of simple relations of gas dynamics and mechanically actuated parts are quite dispensed with. Great accuracy in the measurements accordingly ensues, as no inertia effects of actuated parts occur to make the results inaccurate or wrong. The instruments, such as volume meter and pressure gauge, may, if desired, be calibrated direct to mean cylinder pressures.

In detail the device therefore, when used in connection with a pressure gauge, may consist of a member with a narrow aperture, a chamber lying behind this member with reference to the direction of flow of the medium, into which chamber a quantity of gas or steam is tapped off, the weight of which is proportional to the mean cylinder pressure, and an instrument connected up to this chamber for the determination of the pressure which is proportional to the weight of the quantity tapped off. The chamber need not lie immediately behind the outflow aperture, but may be connected up with same by means of flexible piping. In the case of engines with a number of cylinders, e. g. internal combustion engines, the piping of all cylinders may terminate in a joint distributing device, and can be connected up by means of the latter at option with the chamber. In this way all cylinders can be connected up in succession with one and the same instrument. Stop cocks or valves can furthermore be introduced in the pipings, which cocks or valves may be of usual type. It is further possible to fit suitable filters in front of the outflow aperture of the chamber to retain any impurities which may be found in the gases or vapours.

In the annexed drawing a device in accordance with the invention in conjunction with a multi-cylinder engine and a pressure gauge, is shown in diagrammatic form.

The engine, the mean cylinder pressure of which is to be determined by the device in accordance with the invention, has 6 cylinders in the present example of construction, viz. I to VI, of which for the sake of simplicity only the two outside ones are shown. On each of these cylinders is fixed a casing A which contains the tapping off place for the medium to be drawn from the cylinder and also a duct with narrow passage aperture. A piping B, which may be flexible, is connected up with each casing A. All pipings B lead to a mounting board C which carries a container D with the chamber for the tapped off medium and the laminary flow resistances, also a pressure gauge E. The pipings B terminate in a distributing strip F which is connected by means of a length of hose G with the container D; the container D is connected up with the instrument E by means of a further length of hose H. The casing A is fixed on a base 10 screwed into the wall of the cylinder to be examined, through which base passes an outflow duct 11 terminating in the interior of the cylinder for the medium to be measured. The duct 11 may be throttled by a cock 12 of ordinary type which is inserted in the base 10. The turning of the cock is effected in known manner by means of a grip 13. At cylinder I the cock is opened and at cylinder VI on the other hand closed.

The actual casing A consists of two halves, an under part 14 and a top part 15, which are screwed together by means of screw threads. The connection of the under part 14 with the base 10 is effected by means of a union 17, which is screwed on the base 10 and is provided with a grip 18. A packing ring 19 which is placed on the top edge of the base ensures adequate closing. For the same reason the surfaces of the base 10 and of the casing part 14 are tapered.

The outflow duct 11 continues in the under part of the casing 14 in a longitudinal duct which is enlarged at its upper end in funnel form and ends there in front of a baffle plate 21. The baffle plate itself is provided with two axial apertures 22 through which the medium flowing from the ducts 11 and 20 reaches a chamber lying behind the baffle plate 21. This chamber is filled by a suitable cylindrically shaped filter body 23, which is inserted with its lower edge in the baffle plate 21 and with its upper edge on the other hand in a short nozzle piece 24. The nozzle piece 24 has a bore 25 tapered off towards the top, through which the medium rises upward from the space in the filter body 23 until it comes into contact with a further baffle plate 26, which is also provided with axial outflow apertures. The baffle plate 26 is made in one piece with a jacket 27, enclosing the nozzle piece 24, which jacket rests on the upper edge of the under part of the casing.

Above the baffle plate 26 is inserted a disc 28 in the path of the flowing medium. This disc has a narrow passage through its centre which is surrounded by the actual accumulating edge. This aperture has the smallest cross section in the tapping off duct for the medium drawn from the cylinder and therefore controls the volumes drawn from the cylinder. The disc 28 is pressed against a shoulder 31 of the upper part 15 of the casing by a screwed bush 30. On the other side of the disc 28 the path for the flowing medium continues in a duct 32. The piping B is connected to this duct 32 by means of a screw connection 33.

The pipings B coming from the various cylinders I to VI terminate at a distributing strip F of the mounting board C. Each piping B therefore corresponds with a socket 40 on the distributing strip. The length of hose G is equipped with a nozzle of known type which can be inserted in one of the sockets 40. The nozzle and the socket may be of usual type, so that it is unnecessary to enter into details here. As will be seen, the hose G may be connected up at option with any of the pipings B, so that the instruments arranged on the mounting board C may also operate as desired with any of the cylinders I to VI.

The other end of the length of hose G is connected up to a nozzle 42 below the container D. The container itself consists of a base plate 43, a top plate 44 and a centre part 45. The two plates 43 and 44 are fixed by bolts 46 to the centre part 45. Packings 47 and 48 respectively are placed at the edges of the centre part to prevent any leakage of the gas or steam. The centre piece 45 contains in its lower half a filter block 48' of wadding or other suitable material, which is surrounded by an inspection glass 49. On the upper and lower sides of the filter block are perforated plates 50, 51.

Over the perforated plate 51 is arranged a chamber 52, in which the medium tapped off from the cylinder accumulates. This chamber 52 is connected up by means of the length of hose H with the measuring instrument E. In the example shown the instrument E is a pressure gauge which measures the difference in pressure between the chamber 52 and the atmosphere. In order that this difference in pressure shall be proportional to the weight of gas or steam contained in the chamber 52, it is necessary that the decrease of pressure between the chamber and the atmosphere shall proceed in a straight line stream. For this purpose laminary flow resistances are introduced between the chamber and the atmosphere, which are formed as capillary tubes 53.

The capillary tubes 53 are inserted in a pressure-tight manner by means of holders 55 in a transversal wall 54 of the container, the lower ends projecting into the chamber 52 and the upper ends into a further chamber 56 in the container D. The chamber 56 communicates with the outer air by a bore 57 in the plate 44 and by lateral exhaust slots 58.

The container D is fixed to the mounting plate C by means of bolts 59 which pass through eyes 60.

I claim:—

1. Apparatus for measuring the mean cylinder pressure of reciprocating engines, comprising means for continuously tapping off a medium contained in the engine cylinder, a chamber arranged in communication with said tapping off means, said means including a member having a passage of restricted section for the flow of the medium from the cylinder to said chamber, means for direct and continuous communication of said chamber with the atmosphere adapted to create an unvaried counter pressure in the chamber, and an instrument in communication with the interior of the chamber for measuring the pressure in said chamber.

2. Apparatus for measuring the mean cylinder pressure of reciprocating engines, comprising means for continuously tapping off a medium contained in the engine cylinder, a chamber arranged in communication with said tapping off means, said tapping off means including a casing and a disc having a passage therein of restricted section for the flow of the medium from the cylinder to said chamber, means for direct and continuous communication of said chamber with the atmosphere and adapted to create an unvaried counter pressure in the chamber, and an instrument in communication with the interior of the chamber for measuring the pressure in said chamber.

3. Apparatus for measuring the mean cylinder pressure of reciprocating engines, comprising means for continuously tapping off a medium contained in the engine cylinder, a chamber arranged in communication with said tapping off means, said means including a member having a passage of restricted section for the flow of the medium from the cylinder to said chamber, means for direct and continuous communication of said chamber with the atmosphere adapted to create an unvaried counter pressure in the chamber, and an instrument in communication with the interior of the chamber for measuring the pressure in said chamber, the second mentioned means including a series of capillary tubes arranged to ensure a stream line flow of the medium from the chamber to the atmosphere.

4. Apparatus for measuring the mean cylinder pressure of reciprocating engines, comprising means for continuously tapping off a medium contained in the engine cylinder, a chamber arranged in communication with said tapping off means, said means including a member having a passage of restricted section for the flow of the medium from the cylinder to said chamber, means for direct and continuous communication of said chamber with the atmosphere adapted to create an unvaried counter pressure in the chamber, and an instrument in communication with the interior of the chamber for measuring the pressure in said chamber, the last mentioned means including a plurality of tubes having bores of restricted section.

5. Apparatus for measuring the mean cylinder pressure of reciprocating engines, comprising means for continuously tapping off a medium contained in the engine cylinder, a chamber arranged in communication with said tapping off means, said means including a member having a passage of restricted section for the flow of the medium from the cylinder to said chamber, means for direct and continuous communication of said chamber with the atmosphere adapted to create an unvaried counter pressure in the chamber, an instrument in communication with the interior of the chamber for measuring the pressure in said chamber, and filtering packings arranged to filter the medium passing into said chamber.

6. Apparatus for measuring the mean cylinder pressure of reciprocating engines, comprising means for continuously tapping off a medium contained in the engine cylinder, a chamber arranged in communication with said tapping off means, said means including a member having a passage of restricted section for the flow of the medium from the cylinder to said chamber, means for direct and continuous communication of said chamber with the atmosphere adapted to create an unvaried counter pressure in the chamber, an instrument in communication with the interior of the chamber for measuring the pressure in said chamber, and baffle chambers arranged in said tapping off means in advance of the restricted passage in said member.

OTTO LEHMANN.